United States Patent [19]
Murayama

[11] 3,885,301

[45] May 27, 1975

[54] PYROELECTRIC ELEMENT OF POLYMER FILM

[75] Inventor: Naohiro Murayama, Iwaki, Japan

[73] Assignee: Kureha Kagaku Kogyo Kabushiki Kaisha, Tokyo, Japan

[22] Filed: Nov. 9, 1972

[21] Appl. No.: 305,036

[62] Division of Ser. No. 242,448, Apr. 10, 1972, Pat. No. 3,794,986.

[30] Foreign Application Priority Data

Apr. 8, 1971 Japan .............................. 46-21374
Apr. 27, 1971 Japan .............................. 46-27159

[52] U.S. Cl. ......... 29/592; 29/592 E; 179/100.41 B; 179/111 E; 307/88 ET; 317/262 E

[51] Int. Cl. ............................................ H04r 31/00

[58] Field of Search ................ 317/262; 307/88 ET; 179/111 E, 100.41 B, 111 R; 340/173.2; 29/592, 592 E, 25.35, 584–586, 573; 204/164; 264/22, 234, 236, 237; 313/14; 315/359, 114, 11 S; 96/1 C

[56] References Cited

UNITED STATES PATENTS

| | | | |
|---|---|---|---|
| 3,303,401 | 2/1967 | Naumann et al. | 307/88 ET |
| 3,660,736 | 5/1972 | Igarashi et al. | 317/262 E |
| 3,702,493 | 11/1972 | Murphy | 29/592 |

*Primary Examiner*—C. W. Lanham
*Assistant Examiner*—Joseph A. Walkowski
*Attorney, Agent, or Firm*—Sughrue, Rothwell, Mion, Zinn & Macpeak

[57] ABSTRACT

A pyroelectric element comprising a polymer film which can be converted into pyroelectric substance, the polymer film having a pyroelectric distribution along its surface. The process of producing such a film comprising:

poling desired local portions of the film while varying either the temperature and/or the electric potential of localized areas of the film;

a further process of producing such a pyroelectric element wherein a definite pyroelectricity is provided to the surface of the polymer film and then a non-uniform distribution of pyroelectricity is provided by locally reducing or eliminating the pyroelectricity;

a process of storing and reproducing signals in such a pyroelectric element comprising:

storing polarization signals of different pyroelectricities in different portions of such an element, and then delivering the signals as a polarization change due to a temperature change.

11 Claims, 13 Drawing Figures

PYROELECTRIC ELEMENT OF POLYMER FILM

Figure 1A:
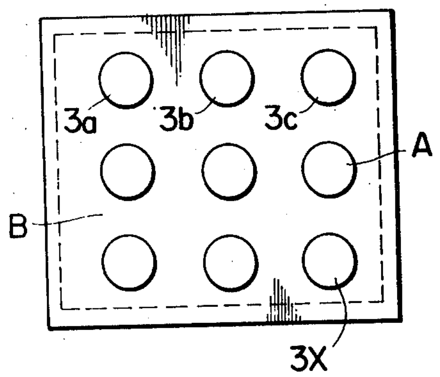

This is a Division of application Ser. No. 242,448, filed Apr. 10, 1972, now U.S. Pat. No. 3,794,986.

BACKGROUND OF THE INVENTION

1. Field of the Invention

The present invention relates to a polymer film having a pyroelectric non-uniform distribution and also to a process of producing such a pyroelectric polymer film. Furthermore, this invention relates to an application of the pyroelectric polymer film to a storage element or a reproducing element.

2. Description of the Prior Art

A phenomenon of varying the polarization of a dielectric substance by the variation of temperature is generally called "pyroelectricity." The polarization of a dielectric substance can be usually caused by various methods. In the most general method, by exposing a dielectric substance to a high electric field, the dielectric substance is provided with a permanent polarization even after removing the electric field. In this case, there is a polarization which forms an electric field outside and such a polarization which forms no electric field outside but which forms an electric field inside. A substance having those polarizations is sometimes called an "electret" in a wide sense and a substance having the polarization forming an electric field only outside is sometimes called an "electret" in a narrow sense. However, because the definition of an electret in a wide sense is also the definition of a ferroelectric substance in a wide sense, the definition of an electret in a narrow sense has been generally used.

The electret having an electric field outside frequently loses its outside electric field or its function as an electret owing to the absorption of various ions on the surface thereof and the orientation of dipoles.

When the temperature of an electret is raised, the polarization is changed to generate pyroelectricity and thus the generation of pyroelectric current is observed. This results from the breaking of polarization as will be understood from the fact that such an electric current is frequently called depolarized current. In this case, such pyroelectricity thus formed is unstable, that is, when the heated substance is cooled and then heated again, a large pyroelectric current as in the original heating case is not usually obtained, in other words from such a conventional electret reproducible pyroelectricity is not obtained.

The inventors have already discovered, however, that some polarized polymer dielectric substances show reproducible and stable pyroelectricity even when the substances are repeatedly subjected to temperature increase and temperature decrease.

Some of such stabilized pyroelectric materials do not have an outside electric field. The electret in the narrow sense is a material having an outside electric field by polarization but the stable pyroelectric material is a material showing stable pyroelectricity and thus the former is utterly different from the latter in the point that in the former the outside electric field is observed, while in the latter the variation of polarization with the variation of temperature is observed.

Hitherto, pyroelectricity has been considered to be a phenomenon occuring mainly in the crystals of inorganic materials and there are known such paraelectric substances as touramaline and ammonium oxalate and such ferroelectric substances as barium titanate and triglycine sulphate. In this case the term "pyroelectricity" means the stable pyroelectricity as mentioned above, that is, the term is used in the narrow sense.

Many electrets do not illustrate pyroelectricity in the narrow sense (hereinafter, pyroelectricity in the narrow sense is simply called pyroelectricity in this specification). Typical examples of such electrets are the electrets made of polystyrene or tetrafluoroethylene. Some electrets may show pyroelectricity in a wide sense but in this case the pyroelectric current caused by the outside electric field is frequently unstable, which results in problems, and thus it is desirable to remove such an unstable polarization according to the use of the electret. Also, an electret can show pyroelectricity only in a definite temperature range, that is, it loses, as a matter of course, its stable pyroelectricity if the electret is heated to a temperature higher than a certain critical temperature.

Hitherto, pyroelectric inorganic crystals have been utilized in various industrial fields, for example, for infrared radiation detection generation of electricity, detection of temperature change, etc., but because it is quite difficult to make a pyroelectric element having a wide area, a pyroelectric element having a thin thickness, and a flexible pyroelectric element from such pyroelectric inorganic crystals, the application of the conventional pyroelectric material has been narrow.

It has been known that some polymers have pyroelectricity but since the pyroelectricity of a polymer is less than that of the aforesaid inorganic material and further a stable pyroelectric polymer element cannot be prepared from such a conventional polymer, the applications of such polymer pyroelectric elements have hardly been studied.

The inventors have, however, succeeded in preparing a pyroelectric polymer having a highly sensitive and stable pyroelectricity. That is, the present invention relates to a pyroelectric polymer film having a non-uniform distribution of pyroelectricity prepared by providing different pyroelectricities on different portions of a polymer film which can be endowed with a stable pyroelectricity. The invention relates, further, to a process of producing such a pyroelectric polymer film as mentioned above as well as the applications of the pyroelectric polymer film.

Since it has hitherto been difficult by conventional art procedures to make a pyroelectric element having a thin thickness or having a sufficient area from a conventional pyroelectric materials, such as a ferroelectric material, a polymer film having a non-uniform distribution of pyroelectricity as in this invention has not been prepared prior to this invention.

A polymer film generally has merit owing to the good workability of the polymers that a polymer film of a thickness of from less than a few microns to thicker than a few millimeters can be prepared and in general the thickness of the film can be reduced greatly. The pyroelectricity of a pyroelectric material is independent of the thickness of the material when the pyroelectricity is observed as a pyroelectric current delivered therefrom and also the temperature change is larger as the heat capacity of the material is lower. Accordingly, the sensitivity of a pyroelectric material is higher as the thickness of the material is made as thin as possible.

The pyroelectric polymer film is superior to conventional pyroelectric inorganic materials in such points that when a non-uniform distribution of pyroelectricity is provided to the film as in this invention, the non-uniform distribution can be fined more as the thickness of the film is thinner and also a flexible film having a large area can be formed easily. Also, such a pyroelectric polymer film is superior to pyroelectric inorganic materials in the point that the former can be readily handled as compared with the latter.

The provision of pyroelectricity to a polymer film which can be endowed with pyroelectricity can be practiced by polarizing the polymer film directly under a high electric field at a temperature of higher than room temperature.

For example, a polymer film having pyroelectricity at local portions thereof can be prepared by placing a pair of electrodes on the opposite surfaces of arbitrary local portions of a polymer film that can be converted into a pyroelectric material and applying to each pair of electrodes an electric potential while maintaining the local portions at a predetermined temperature higher than room temperature. In this case, by applying a different electric potential to each pair of electrodes, each local portion of the film can be endowed with a different pyroelectricity. Also, the polymer film having a non-uniform distribution of pyroelectricity can be produced by moving successively a pair or pairs of electrodes along the opposite surfaces of the polymer film or moving continuously the polymer film between a pair or pairs of electrodes while applying an electric field to the electrodes instead of placing many electrodes on the opposite surfaces of the local portions of the polymer film.

Furthermore, still other methods may be employed for producing the polymer films having non-uniform distribution of pyroelectricity as in the present invention. For example, when the total area of each of the surfaces of a polymer film capable of being endowed with pyroelectricity is uniformly covered with an electrode layer and while applying a definite electric potential to the electrodes, a non-uniform temperature distribution is formed on the film by the irradiation of, e.g., infrared rays, the polymer film is provided with a non-uniform distribution of pyroelectricity in proportion to the non-uniform temperature distribution. In this case, also, the electrodes on the surfaces of the polymer film may be divided into plural small electrodes isolated from each other and they may have applied different electric potentials and at the same time may be heated to different temperatures. Furthermore, the polymer film may be provided with a non-uniform distribution of pyroelectricity by providing first a definite pyroelectricity to the whole surface or a part of the film and then reducing or removing locally the pyroelectricity.

In the case of applying electric potentials to the polymer film, separate electrodes may be employed but electrodes of a conductor such as a metal or graphite, vacuum deposited or attached to the surfaces of the polymer film, may be used as the electrodes. The electrode on the one surface of the polymer film may be grounded.

Figure 1B:
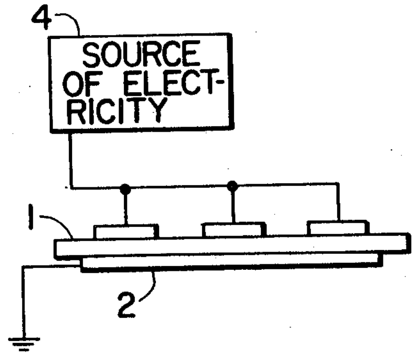
Figure 2:
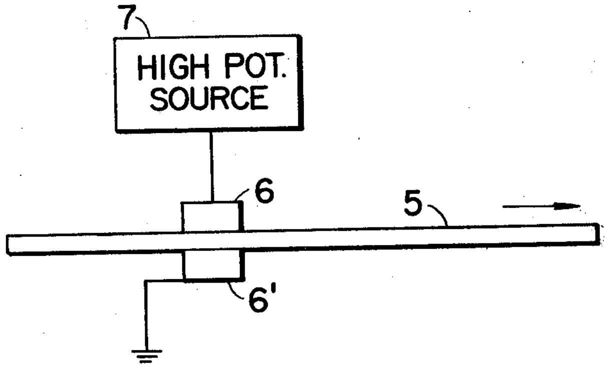
Figure 3:
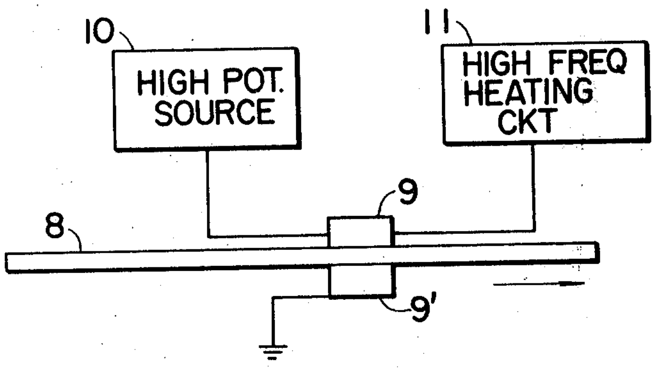
Figure 4A:
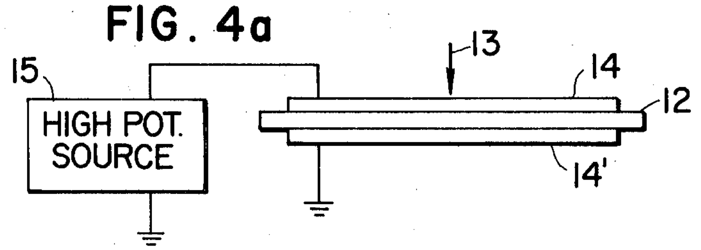
Figure 4B:
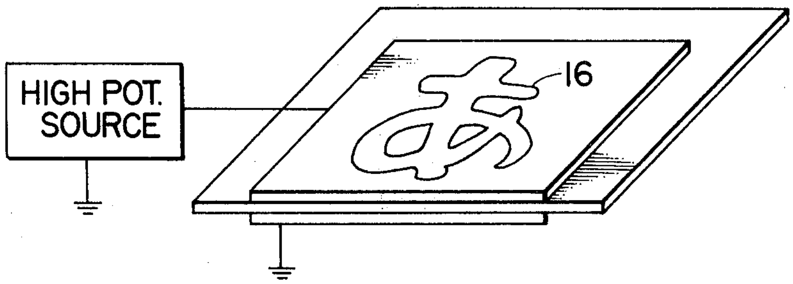
Figures 7, 8:
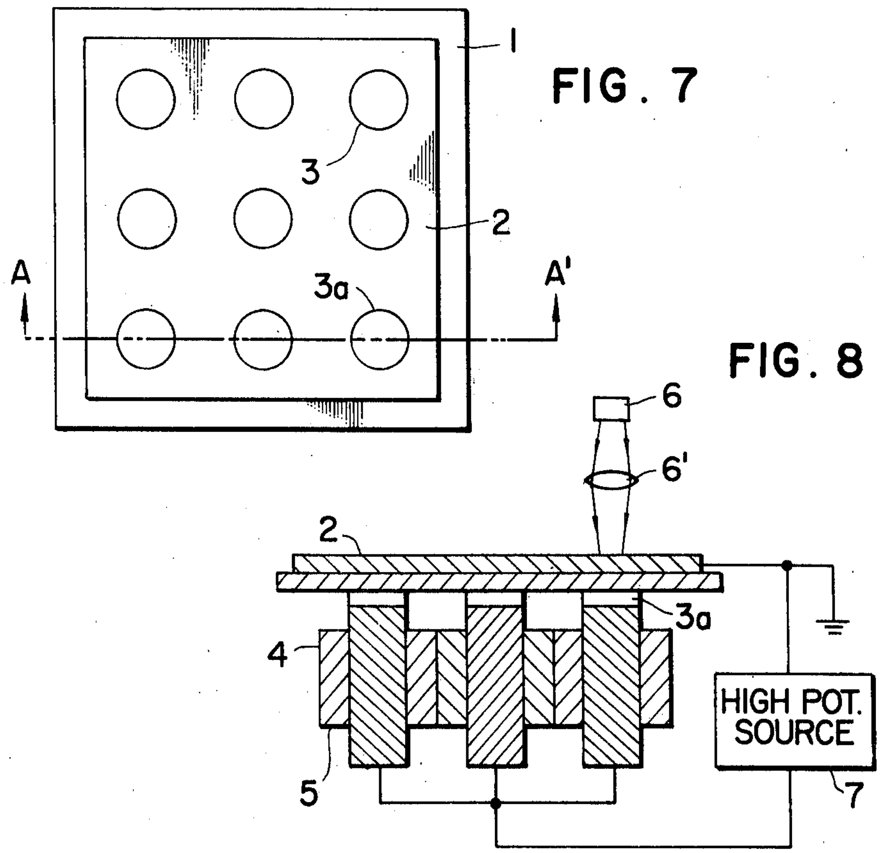
Figure 5:
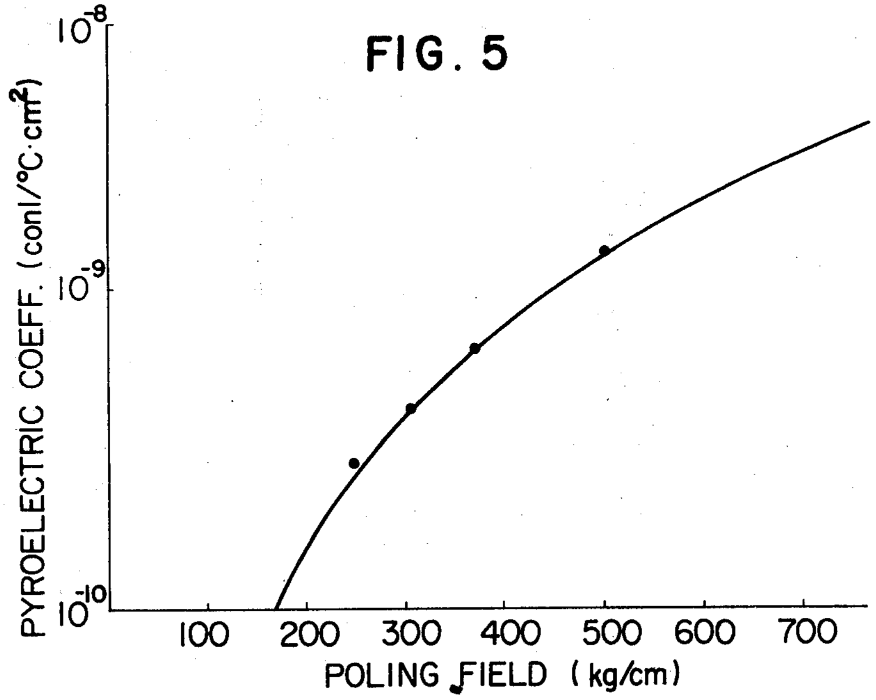
Figure 6:
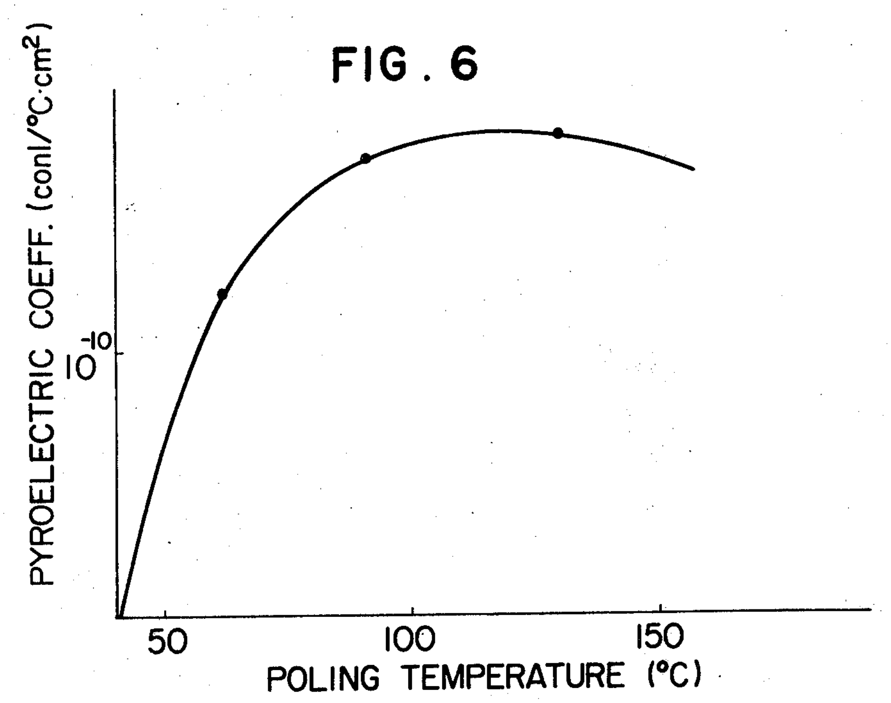
Figure 9:
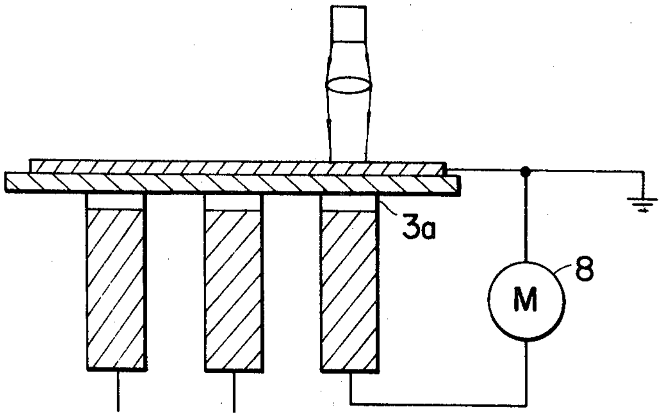
Figure 10:
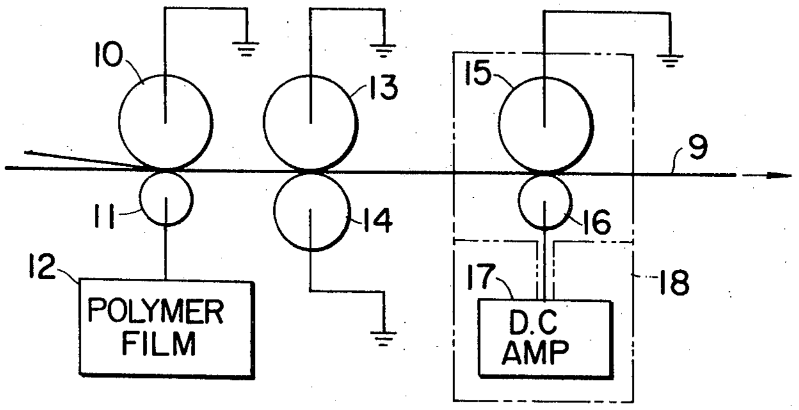
Figure 11:
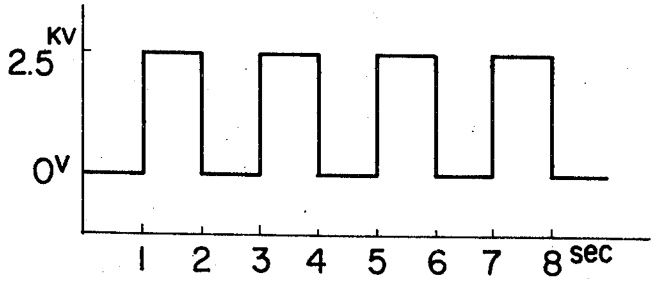

The production of the pyroelectric polymer film of this invention will be practically explained by referring to the accompanying drawings, in which FIG. 1(*a*) is a schematic plane view showing an embodiment of producing the pyroelectric polymer film of this invention and FIG. 1(*b*) is the cross sectional view of the above embodiment, FIG. 2 and FIG. 3 are schematic cross sectional views showing other two embodiments of producing the pyroelectric polymer films of this invention, FIG. 4(*a*) is a schematic cross sectional view showing still another embodiment of the invention and FIG. 4(*b*) is the perspective view of the above embodiment, FIG. 5 is a graph showing the relation of the poling field and the pyroelectric coefficient, FIG. 6 is a graph showing the relation of the poling temperature and the pyroelectric coefficient, FIG. 7 is a plan view showing an embodiment of a storage element of this invention, FIG. 8 is a schematic cross sectional view showing an embodiment of a storage allocation device using the storage element corresponding to the cross sectional view taken along line A–A' of FIG. 7, FIG. 9 is a schematic cross sectional view showing an embodiment of a storage reading device using the storage element of this invention, FIG. 10 is a flow diagram showing an embodiment of the apparatus for producing the pyroelectric polymer film of this invention, and FIG. 11 is a view showing an example of a storage signal used in this invention.

Now, in FIG. 1, an aluminum electrode 2 is formed on the lower surface of a polymer film 1 by vacuum deposition and partial electrodes 3*a*, 3*b*, 3*c*, ----- 3*x* are formed on the opposite surface of the polymer film. When an electric potential is applied to the electrodes from a source of electricity 4 while maintaining the assembly at a temperature higher than room temperature and then the temperature of the system is lowered, a non-uniform distribution or figure of pyroelectricity corresponding to the electrodes on the upper surface of the polymer film is obtained on the film. In addition, the pyroelectricity obtained in this case contains an unstable pyroelectricity and a comparatively high pyroelectric current is obtained and such a pyroelectric polymer film may be satisfactorily used for the purpose of knowing the presence of a pyroelectric current but even for such purpose it is as a matter of course preferable to obtain a stable pyroelectric current.

When it is required to obtain a definite pyroelectric current corresponding to the pyroelectricity provided to the polymer film having such non-uniform distribution of pyroelectricity, it is particularly desirable that the pyroelectricity is stable. Such a stable pyroelectricity can be obtained by applying an electric potential to the polymer film provided with the pyroelectricity to remove the unstable pyroelectricity and leave only the stable pyroelectricity.

The unstable pyroelectricity can be removed from the polymer film provided with the non-uniform distribution of pyroelectricity by treating the polymer film at a high temperature or exposing the polymer film to water or moisture to such an extent that only a constant pyroelectric current is obtained.

In the embodiment shown in FIG. 2, a long polymer film 5 is moved continuously or intermittentaly in the direction of the arrow through a space between the electrodes 6 and 6' heated to a definite temperature. The electrode 6' is grounded and an electric potential is applied intermittently to the electrode 6 from a a high potential source 7, whereby a non-uniform distribution of pyroelectricity can be provided on the surface of the film. In this case, the electrodes 6 and 6' may be moved be means of a belt in place of moving the polymer film or the electrodes 6 and 6′ may be roller type electrodes. Also, instead of heating the electrodes, the polymer film may have been heated prior to the application of the electric potential. Furthermore, the portions applied to the electric potential may be heated by the irradiation with radiation such as infrared rays.

In FIG. 1 and FIG. 2 are illustrated the embodiments of varying the electric potential to be applied while maintaining the temperature of the polymer film at a constant temperature. In FIG. 3, however, an example wherein the temperature of heating the polymer film is changed while applying a constant electric potential is shown.

That is, in FIG. 3, a polymer film 8 is intermittently passed through a space between the electrodes 9 and 9′. The electrode 9′ under the polymer film is grounded and a definite electric potential is applied to the upper electrode 9 by connecting it to a high potential source 10. The upper electrode 9 is also connected to a high frequency heating circuit 11 and a high frequency energy is intermittently applied to heat the film by high frequency induction, whereby a polymer film having thereon a non-uniform distribution of pyroelectricity corresponding to the intermittent pattern of high frequency heating is obtained. In this case, it is as a matter of course necessary to preliminary adjust the matching and the connection time of the high frequency oscillation circuit in accordance with the kind, and thickness of the polymer film and the interval between the electrodes to that the polymer film is heated to a proper temperature lower than the melting point of the film by the high frequency heating.

Moreover, in the embodiment shown in FIG. 3, the d.c. electric potential source and the high frequency source may be applied intermittently at the same time or alternately to each other.

FIG. 4 illustrates another embodiment of changing the heating temperature of the polymer film. That is, a polymer film 12 is disposed between an electrode 14 and an electrode 14′ and the electrode 14′ is grounded, while the electrode 14 is connected to a d.c. high potential source 15. Now, the electrode 14 is made of a transparent conductive layer such as NESA glass and the film is irradiated by infrared rays 13 through the transparent electrode 14. In this case, when the electrode is covered by a proper material or an image, the non-uniform distribution of pyroelectricity corresponding to the densities of the covered material or image is formed on the polymer film.

In the above example, a thin film of a conductor may be vacuum deposited on the polymer film in place of using the transparent electrode 14 as mentioned above and the polymer film may be irradiated by infrared rays or a laser through the deposited film. In addition, the non-uniform distribution of pyroelectricity may be formed on the polymer film by varying the intensity of infrared rays irradiated while moving the infrared source or moving the polymer film. Furthermore, in this case, the d.c. potential may be varied or applied intermittently.

Still further, the variation of the heating temperature of the polymer film may be conducted by varying the temperature of the electrodes.

The d.c. potential to be applied onto the arbitrary portions of the polymer film for providing thereto pyroelectricity is from 30 kv./cm. up to a value lower than the endurable potential of the polymer film and also the temperature of heating the polymer film is desirably a temperature between 40°C. and the melting point of the polymer film. If either the electric potential or the heating temperature is lower than the aforesaid value, it is difficult to provide pyroelectricity to the polymer film, that is, when an electric potential is applied onto the polymer film under such conditions, the portion of the polymer film is hardly provided with pyroelectricity. On the other hand, if the electric potential to be applied is higher than the endurable value of the polymer or the heating temperature is higher than the melting point of the polymer film, the film will be broken.

The polymer film endowed with pyroelectricity be the process of this invention may be further stabilized by treating the polymer film at a high temperature or exposing the polymer film to water or moisture as mentioned above. In case of treating the polymer film at a high temperature, the unstable pyroelectricity may be removed from the polymer film be heating the polymer film to a temperature of from 40°C. to the melting point of the polymer film until the pyroelectricity becomes constant or subjecting repeatedly the polymer film to a temperature increase and temperature decrease between a temperature of higher than room temperature and a temperature lower than the melting point of the polymer film. The pyroelectric material thus stabilized by the treatment at a high temperature can provide a definite pyroelectric current corresponding to the change in temperature in the temperature range of lower than the treated temperature.

Examples of the polymer capable of being provided with pyroelectricity are a fluoride resin composition, a polyvinylidene, a polyvinylidene fluoride series resin composition, a polyvinyl fluoride series resin composition, a polyvinyl chloride series resin composition, and a dispersion of a pyroelectric inorganic crystal powder in a polymer. However, the polyvinylidene fluoride series resin composition is particularly preferable since it provides the polymer film showing quite a high pyroelectricity that is not obtained by using other polymers. The term polyvinylidene fluoride series resin composition includes a polyvinylidene fluoride resin, a vinylidene fluoride base copolymer with a comonomer copolymerizable with it, and a blend of the resin and the copolymer or a blend of the resin or the copolymer and other polymer.

As the comonomer used for the copolymer with vinylidene fluoride, there are illustrated vinyl fluoride, trifluoroethylene, chlorotrifluoroethylene, tetrafluoroethylene, and other known copolymerizable monomers.

The polymer film used in this invention may be fabricated from the above-mentioned resin or copolymer by a known manner by utilizing the various features of the polymer or thermoplastic resin.

Various methods of providing piezoelectricity to a polarized dielectric polymer have hitherto been proposed. This is particularly remarkable in the polyvinylidene fluoride series resin. According to the inventors' investigations, it has been discovered that a homopolymer or a copolymer of more than 70 percent vinylidene fluoride can provide easily a pyroelectric material having not only a quite high pyroelectricity but also a quite stable pyroelectricity and piezoelectricity.

Because a pyroelectric material generally has a piezoelectricity, the polymer film of this invention having a distribution of pyroelectricity is also a polymer film having a non-uniform distribution of piezoelectricity and thus it can provide an electric signal not only by a thermal change but also by a mechanical stress.

The polymer film having pyroelectricity thus obtained has properties as a polymer such as good workability, flexibility, and water resistance and hence it may be utilized in various industrial fields. That is, for example, a film having a large number of small pyroelectric portions can be prepared in one operation and can be used for thermography. The film can also be utilized for the reproduction and input of the storage of figures by utilizing the distribution of the pyroelectricity.

Various storage elements using dielectric substances have hitherto been known. In one of them an electret is utilized, while in another one of them, a ferroelectric substance is utilized. The former is a type in which a signal is stored by changing or breaking the polarization in the electret, while the latter is a type in which a hysteresis between the electric field and the electric polarization in the ferroelectric substance is utilized.

The storage element of this invention is utterly different from such a conventional dielectric substance type storage element. That is, the present invention also relates to a signal storage and reproduction method wherein signals are stored as polarization in a storage element composed of a polymer film capable of being provided with pryelectricity by providing different pyroelectricities to the arbitrary different portions on the surface of the element and then the temperature of the polymer film is changed suddenly, whereby the storage is converted into a quantity of electricity followed by change in polarization caused by the increase or decrease of temperature and then the electricity is delivered as a signal.

In order to store signals in the polymer film, the film may be provided with a distribution of pyroelectricity as mentioned above. For example, a definite pyroelectricity is first provided to the whole surface or a part of the surface of the polymer film and then the pyroelectricity is locally reduced or removed, whereby fresh or other signals can be stored. Such a removal or reduction of storage can be conducted also by increasing sufficiently the temperature of the polymer film and applying to the film an opposite electric potential at a temperature capable of destroying the whole or a part of the polarization contributing to the pyroelectricity.

The signal thus stored can be read as a form of electric current or electric potential using a signal reading device by increasing or decreasing the temperature of the pyroelectric polymer film at the portion contacted to the electrode of said signal reading device. For example, the portion of the polymer film may be heated or cooled by heating or cooling the electrode of the signal reading device or by employing a transparent electrode as the electrode of the signal reading device and irradiating the portion contacted to the transparent electrode with radiation such as infrared rays.

When the polymer film having stable pyroelectricity is employed, the signals stored in the polymer film can be read repeatedly and after eliminating the stored signals therefrom, the polymer film can be used again for the storage of signals.

Such a storage element composed of the pyroelectric polymer film has a quite a remarkable feature in the point that the element has a relation to radiation such as light, infrared rays, a laser beam, etc. That is, because the storage and reproduction of signals and the elimination of the storage can be conducted by using the radiation as mentioned above, the storage element of the pyroelectric polymer film can be utilized in computers, transmitters of figures or characters, etc.

Moreover, a figure can be stored in the pyroelectric polymer film by using radiation such as light or a laser. For example, when a figure is projected by the radiation onto the pyroelectric polymer film to which a definite electric potential has been applied, the figure is stored in the film as a pattern of pyroelectricity. As one example, the storage element of the pyroelectric polymer film is used for laser hologram. Also, the reproduction of the storage of figures may also practice by other methods than the method of using pyroelectricity. For example, the signals stored may be reproduced or read by utilizing the optical anisotropy of the film.

It has been known that in the case of utilizing the pyroelectricity of a pyroelectric substance it can respond to infrared rays at an extremely high speed or less than few microseconds, e.g., of few nanoseconds and thus the reading or reproduction of signals or figures stored can be made at an extremely high speed in the case of utilizing such a pyroelectricity of the polymer film.

The following examples are intended to illustrate the present invention but not to limit the invention in any way.

EXAMPLE 1

A non-oriented sheet of a polyvinylidene fluoride resin having a thickness of 200 microns was stretched monoaxially to 4.5 times at 90°C. The film thus obtained was cut into a film of 3 cm. × 4 cm. in area. A ground electrode was formed on the lower whole surface of the film by vacuum depositing gold and circular electrodes (A) each having a diameter of 5 mm. were formed on the opposite surface of the film by vacuum depositing gold as shown in FIG. 1 of the accompanying drawings. While applying a d.c. electric potential of 1,200 kv./cm. to each of the circular electrodes through a leading wire, the whole film was maintained at 90°C. for 30 minutes and then while applying the electric potential, the film was cooled to room temperature.

Then, the film was maintained at 80°C. for 2 hours while grounding the both surfaces of the film to remove the unstable pyroelectric current therefrom. The pyroelectric current after the stabilization was $1.5 \times 10^{10}$ amp./cm.$^2$ at 50°C. at a temperature raising rate of 1°C./min. and the value was not changed when the measurement was repeated. Then, circular electrodes (B) each having a diameter of 5 mm. were formed on the surface of the film at the areas bearing no circular electrodes (A) by vacuum depositing gold thereon. When the pyroelectricities of the portion (A) and the portion (B) were compared by measuring the pyroelectric currents of the portions (generated there by the irradiation of infrared rays) it was observed that the pyroelectric current from the portion (A) was more than 50 times larger than that from the portion (B). In addition, the value of the pyroelectric currents were not changed after allowing the polymer film to stand for three months at normal temperature.

EXAMPLE 2

The same film as in Example 1 was endowed with various pyroelectricities by varying the conditions for the polarization and then the change of the pyroelectric coefficient in each case was measured.

That is, the film was polarized at 90°C. while varying the intensity of the electric field applied and then the pyroelectric film was stabilized by grounding both surfaces thereof for 24 hours at 80°C. The pyroelectric coefficient of the film in each case was measured at 50°C., the results of which are shown in the graph of FIG. 5.

Also, the film was polarized at a constant intensity of the electric field of 320 kv./cm. while varying the temperature of the film and was then stabilized in the same way as above. The pyroelectric coefficient of the film measured in each case at 50°C. is shown in FIG. 6.

The experiment showed that the pyroelectric coefficient of the polymer film could be changed by changing the intensity of electric field or the temperature of the film at the polarization thereof.

EXAMPLE 3

A mono-axially stretched film of polyvinyiidene fluoride having a thickness of 25 microns (having mainly β-type crystal structure) was used for practicing the storage and reproduction of signals.

As shown in FIG. 7 and FIG. 8, a thin ground electrode 2 capable of passing infra red radiation was formed on the upper surface of the film by vacuum depositing gold thereon and nine circular electrodes 3 each having a diameter of 5 mm. were also formed on the lower surface of the film by vacuum depositing gold. In addition, the interval of the circular electrodes was 5 mm.

Nine insulated copper rods 5 each having a diameter of 5 mm. were bundled with rubber 4 so that they were disposed with an interval of 5 mm. each other and the ends of the rods were cut in a plane vertically to the lengthwise direction thereof. Then, after removing the insulation cover from each rod, at a portion about 2 mm. from the end, each cut surface of the end of the copper rods was polished smoothly. The assembly of the copper rods was disposed so that each of the ends of the copper rods was brought into each of the circular gold electrode a vacuum deposited as above.

In addition, the film shown in the figures was mixed at the periphery by a frame (not shown).

A part of the circular electrode *3a* was irradiated by a spot of infrared rays having a diameter of 5 mm. formed by focusing the infrared rays from the inrared source 6 by means of a lens 6', whereby only a portion of the film was heated to about 90°C. Under such conditions, an electric potential of one kilovolt was applied between each of the circular electrodes and the ground electrode from a power source 7 for 3 seconds in such a manner that the irradiation of infrared was stopped and then the application of the electric potential was stopped after 2 seconds then. Rgw polyvinylidene fluoride film was hardly polarized at the temperature of lower than 40°C. under the application of electric field and the pyroelectric polarization was stored in the position of the circular electrode *3a*.

When a vibrating reed electrometer 8 (made by Kobayashi Riken K. K.) was connected to each of the circular electrodes as shown in FIG. 9 of the accompanying drawings and while irradiating the circular electrode thus connected to the vibrating reed electrometer by infrared rays, for an example in each case, the pyroelectric current delivered from the electrode was measured, whereby a pyroelectric current of about $10^{-2}$ ampere was observed only from the circular electrode *3a* and pyroelectric current was hardly observed from other circular electrodes.

EXAMPLE 4

A polyvinylidene fluoride resin was fabricated into a sheet having a thickness of 100 microns using a T-die. The sheet was mono-axially stretched to more than 4 times at 90°C., heat treated, and cut into a long film having a width of 1 cm. and a thickness of 25 microns. The film was used as a tape-shaped storage element for the apparatus shown in FIG. 10. In the figure, the film 9 traveled continuously in the direction of arrow at a rate of 1 cm./sec. The film was first passed between a grounded heating roll 10 maintained at 100°C. by means of a heater disposed in the roll and an electrode 11 for storage to which an electric potential of the rectangular wave as shown in FIG. 11 was applied. The tape was passed between the earthed rolls 13 and 14 each heated to 100°C. to remove the unstable pyroelectricity and then cooled to room temperature. The film was then passed through an grounded roll 15 heated to 60°C. and an opposite electrode roll 16 through which a pyroelectric current was detected by using a d.c. amplifier 17. In this case, the detection part had been shielded by a means 18 as shown in FIG. 10. In the system shown above a pulse current of about $10^{-10}$ ampere was detected every 1 second as in the applied electric potential.

EXAMPLE 5

A mono-axially stretched polyvinylidene fluoride film having a thickness of 25 microns (mainly having a β-type crystalline structure) was provided with gold electrodes as in Example 3 (FIG. 7 and FIG. 8).

The film was heated to 90°C. while applying an electric potential of one kilovolt to the whole circular electrodes for 30 minutes and the cooled while applying the electric potential. After maintaining the film at 80°C. for 24 hours while grounding the electrodes at the opposite surfaces of the film to remove the unstable pyroelectricity, the pyroelectric current delivered from each of the circular electrodes was the same. For eliminating the pyroelectricity of the portion *3a* of the pyroelectric polymer film, the leading wire from the electrode *3a* was grounded and infrared rays of an intensity higher than those used at the provision of the pyroelectricity, or having such an intensity as increasing the irradiated portion up to about 150°C., was applied to the electrode *3a* for 5 seconds. Thereafter, the electrode *3a* was connected again to the electrometer and the electrode was irradiated by infrared rays, for example, whereby the pyroelectric current observed was less than only 1/50 of the amount of the pyroelectric current before the elimination of the pyroelectricity.

Such an elimination technique could also be applied in the case of Example 3 as well as generally.

What we claim is:

1. A process of producing a pyroelectric element having a nonuniform distribution of pyroelectricity along the surface thereof, which comprises polarizing desired local portions of a polymer film, which can be converted into a pyroelectric substance by applying an electric potential to said film, while varying at least one of the temperature and the electric potential at each of the local portions relative to other portions of the film.

2. The process of producing a pyroelectric element as claimed in claim 1 wherein said polarizing of the local portions is conducted under a constant temperature while varying the electric potention at each of the local portions relative to other portions of the film.

3. The process of claim 2, wherein said temperature is above room temperature and said electric potential is varied by placing a plurality of pairs of stationary electrodes so that the members of said pairs are on opposite surfaces of said film at each local portion and applying to each pair an electric potential.

4. The process of claim 3, wherein a different electric potential is applied to each pair of electrodes.

5. The process of claim 3, wherein the electric potential is a d.c. potential of from 30 kv/cm up to a value lower than the endurable potential of the polymer film, and said temperature is between 40°C and the melting point of said film.

6. The process of claim 2, wherein said temperature is above room temperature and said electric potential is varied by positioning said film between at least one pair of electrodes and moving said film relative to said electrodes while applying an electric field to said electrode.

7. The process of producing a pyroelectric element as claimed in claim 1, wherein said polarizing of the local portions is conducted under a constant electric potential while varying the temperature at each of the local portions relative to other portions of the film.

8. The process of claim 1, wherein said electric potential is varied by placing a pair of stationary electrodes at each local portion, applying to each pair an electric potential, and varying the temperature at each of the local portions.

9. The process of claim 1, wherein said polymer is chosen from the group consisting of a polyvinylidene fluoride series resin composition, a polyvinyl fluoride series resin composition, and a dispersion of a pyroelectric inorganic crystal powder in a polymer.

10. The process of claim 9, wherein said polymer is a polyvinylidene fluoride series resin composition.

11. A process of producing a pyrolectric element having a non-uniform distribution of pyroelectricity along the surface thereof, which comprises providing a definite pyroelectricity to the whole surface or a part of the surface of a polymer film, which can be converted into a pyroelectric substance by applying an electric potential to said film, and then locally reducing or eliminating the pyroelectricity of the film to provide a non-uniform distribution of pyroelectricity.

* * * * *